ELECTRICAL LINE-SPLITTER DEVICE

Inventor
John R. Winegard
By Burmeister & Kulie
Attorneys

Inventor
John R. Winegard
By Burmeister & Kulie
Attorneys

United States Patent Office 3,454,905

Patented July 8, 1969

3,454,905

ELECTRICAL LINE-SPLITTER DEVICE

John R. Winegard, Burlington, Iowa, assignor to The Winegard Company, Burlington, Iowa, a corporation of Iowa Filed Jan. 17, 1966, Ser. No. 520,996
Int. Cl. H01p 5/12
U.S. Cl. 333—8 1 Claim

ABSTRACT OF THE DISCLOSURE

An improved low loss line-splitter device for operation across the entire 50–1000 megacycle range, wherein signals from a main line or source are efficiently coupled to a pair of branch lines, effectively isolated from one another, and wherein all terminal and interconnector impedances are appropriately matched.

The present invention relates generally to electrical coupling devices and more particularly to an improved line-splitter useful for transferring signals from a first transmission line to one or more branch transmission lines over a frequency range encompassing the VHF and UHF television channels.

A line-splitter is a device intended for use in connecting a first (source) transmission line to two other (branch) transmission lines so that the signals on the first line are divided and selectively fed to each of the branch lines. Devices of this sort are highly useful in conjunction with transmission line arrangements for feeding television receivers so that a plurality of receivers or transmission lines leading to such receivers may be fed from a single source or feed line. For optimum operation, however, it is important to design a line-splitter device so that each of the two branch transmission lines is isolated from the other; the insertion loss is within small enough limits so as not to affect signal strength in the two branch lines; and the various circuit impedances are appropriately matched to avoid undue standing wave reflections at any point. Heretofore it has not been possible to achieve these performance objectives in a line-splitter having the desired degree of efficiency over a frequency range encompassing all of the assigned television channels, i.e., 50 to 1000 megacycles.

In accordance with the present invention, in one of its aspects, the line-splitter device is arranged in a manner such that the bridging and isolation circuitry is connected first to the source or feed transmission line and is effective to transfer signals therefrom to a pair of reference terminals, each terminal being effectively isolated from the other. Impedance transformation, or matching, circuitry is connected to each of the isolated reference terminals to feed the respective branch lines to match their characteristic impedances. It has been found that by discarding the prior art teaching requiring that the transformation or matching circuitry be connected first to the source or feed line and then followed by the bridging or coupling circuitry, that the overall efficiency of the line-splitter is surprisingly increased whereby effective operation over the entire frequency range encompassing the VHF and UHF television channels is achieved.

A further aspect of the present invention relates to the construction of the impedance matching transformers. Surprisingly, it has been found that by constructing the impedance matching transformers to have one winding thereof "backwound" upon the other of the windings on a common ferrite core, in combination with the other features of the present invention, the device is effective to ensure low-loss operation from the lowest to the highest frequencies of interest (about 50 to 1000 megacycles).

Still another aspect of the present invention resides in maintaining a substantially exact impedance match between each of the coaxial transmission line cables and the respective input and output coax connector jacks as used in the line-splitter device. Even at frequencies of the order of 1000 megacycles it has not generally been considered significant to maintain a substantially strict impedance match between the coax connector jack and the associated coaxial cable. That is, dimensional variations in the parameters of the connector jacks and coax transmission line cables generally are not thought of as a source of mismatch giving rise to any substantial reflections and resultant unfavorable standing wave ratio. In connecting a line to a jack it is usually necessary for the inner conductor of the transmission line cable to insert within a suitably hollow inner conductor of the connector jack. The diameters of inner conductors of the cable and jack must necessarily differ, if only to a small degree. For example, the inner conductor diameter of the jack may be about $\frac{3}{64}$ of an inch, while the inner conductor diameter of the coax cable connected thereto may be about $\frac{3}{128}$ of an inch. It has been found that, despite this rather small variation—on the order of $\frac{3}{128}$ or .0234 of an inch—a significant variation in impedance does occur between line and jack. This can be overcome by constructing the coaxial jacks to have essentially an air dielectric space between the inner and outer conductors to effectively compensate for it. In cooperation with the other constructional features as herein disclosed, this arrangement gives rise to a highly favorable standing wave ratio throughout the 50 to 1000 megacycle operating range than would otherwise occur.

Accordingly, it is a general object of the present invention to provide an improved line-splitter device suitable for accepting signals from a first or source transmission line and selectively transferring the same to a pair of branch transmission lines effectively isolated from one another.

Another object of the present invention is to provide an improved line-splitter device of the foregoing type wherein the respective impedances of the source and branch transmission lines are closely matched over an operating frequency range encompassing the VHF and UHF television channels.

A more particular object of the present invention is to provide an improved line-splitter of the foregoing type wherein the coupling circuitry is connected directly to the source transmission line and impedance transformation circuitry is connected on the high impedance side of the coupling circuitry to provide effective impedance matching of the respective transmission lines, thereby minimizing the effects of variations and increasing overall efficiency of the splitter device over its entire operating range.

An additional object of the present invention resides in the provision of an improved line-splitter wherein the input and output connector jacks are constructed to have essentially an air dielectric space between the inner and outer conductors of the respective connector jacks thereby to compensate for variations between the inner conductor diameters of the jacks and associated cables, and defining a substantially exact impedance match between the jacks and cables.

Yet another object of the present invention is to provide an improved line-splitter of the foregoing type wherein the impedance transformer connected between the coupling circuit and each of branch transmission lines is constructed with one winding wound on top of, or "backwound" upon, the other of the windings on a common ferrite core so as to extend the effective operating range of the line-splitter device up to the highest frequency of interest, viz., 1000 megacycles.

A further and more particular object of the present invention resides in the provision of a small, compact, inexpensive, and yet highly efficient and effective, line-splitter device for coupling television signals in the UHF and VHF bands from one coaxial transmission line cable having a nominal 72 ohm characteristic impedance to two other coaxial transmission line cables having the same characteristic impedance, the line-splitter being so constructed and arranged to be particularly suitable for use in television systems and otherwise suitable for commercial utilization.

The novel features which are believed to be characteristic of the invention are set forth with particularity in the appended claims. The invention itself, however, both as to its organization and as to further objects and advantages thereof will best be understood from the following description, taken in conjunction with the accompanying drawings, in which:

Figures 1, 2, 3:
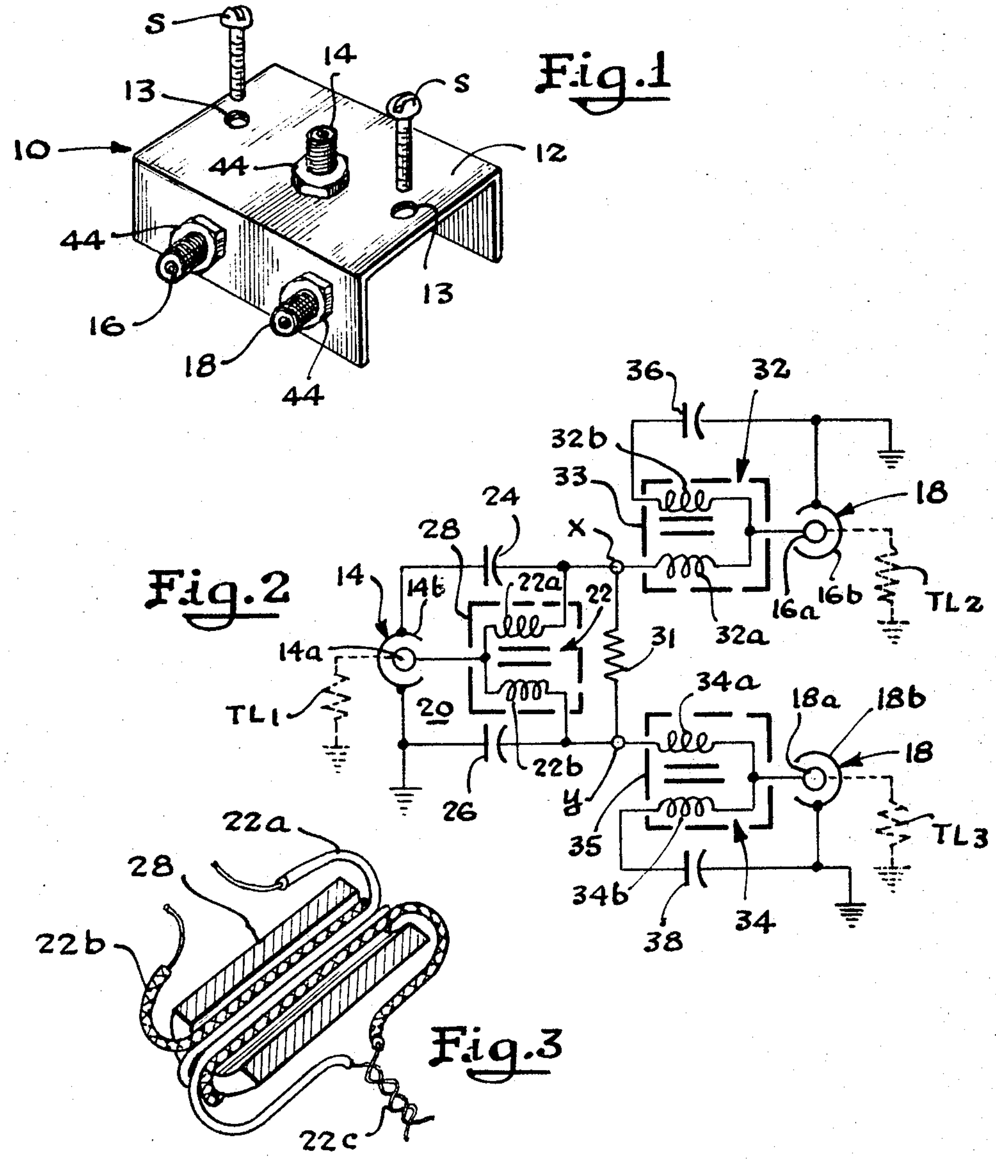
FIGURE 1 is a perspective view of a line-splitter device constructed in accordance with the present invention.
FIGURE 2 is a schematic diagram of the circuitry of the line-splitter of FIGURE 1.
FIGURE 3 is a perspective view in partial cross-section of a portion of the ferrite core showing the winding detail of the coupling transformer.

Referring now to the drawings, a line-splitter device 10 is shown in FIGURE 1 which is constructed in accordance with the present invention. The device 10 includes a generally U-shaped support frame or chassis 12 on which an input coax connector jack 14 and a pair of output coax connector jacks 16 and 18 are mounted on the top and front side, as shown. The associated electrical circuitry and component parts are carried on the underside of the chassis 12 (not shown). The chassis 12 may be secured to a desired surface by any suitable means, such as machine screws S passing thru clearance holes 13 provided in the chassis 12. A complementary housing (not shown) may be provided to effect a completely enclosed structure, if so desired.

The schematic diagram of the electrical circuitry for the line-splitter 10 is shown in FIGURE 2. A first, or source, transmission line $TL_1$ is intended for connection to the input connector jack 14 and a pair of branch transmission lines $TL_2$ and $TL_3$ are intended for connection to the output connector jacks 16 and 18, respectively. The transmission lines $TL_1$, $TL_2$ and $TL_3$ are preferably coaxial cable of the type RG–59/U having a characteristic impedance of approximately 70–75 ohms. The transmission lines in FIGURE 2 are shown as equivalent load impedances in dotted line. A coupling circuit 20 is interconnected between the input connector jack 14 and a pair of reference terminals, identified at X and Y. The coupling circuit 20 includes a coupling transformer 22 having a pair of windings **22*a* and 22*b* wound on a common ferrite core 28. The winding 22*a* is shown connected between the inner conductor 14*a* of the jack 14 and the reference terminal X and the winding 22*b* is shown connected between the inner conductor 14*a* and the reference terminal Y. A DC blocking capacitor 24 is connected between the reference terminal X and the outer conductor 14*b*, the latter being at ground potential. A similar DC blocking capacitor 26 is connected between the reference terminal Y and the outer conductor 14*b*. The windings 22*a* and 22*b* have the same number of turns and are electrically equal, or substantially so. The core 28 is preferably formed of a suitably compressed ferrite material. In its preferred form, the dimensions of the core 28 are approximately ¼" x ¼" x ½". As best seen in FIGURE 3, the core 28 includes a cylindrical bore of approximately ⅛" in diameter along its longitudinal axis. The winding detail is also shown in FIGURE 3. Windings 22*a* and 22*b* preferably include one and one-half turns about the core 28 and formed from small-size, twin-lead conductors having a nominal characteristic impedance of 150 ohms. Winding 22*a* is represented in white and winding 22*b* is represented in black. The windings 22*a* and 22*b* are interconnected to form an autotransformer coupling action. That is, the terminal leads of the windings 22*a* and 22*b* are interconnected at one end forming a center tap 22*c* for connection to the inner conductor 14*a* of the input connector jack 14** and the terminal leads at the opposite are connected, respectively to the pair of reference terminals X and Y.

An impedance transformer 32 interconnects the reference terminal X and the inner conductor **16*a* of the connector jack 16 and an impedance transformer 34 interconnects the reference terminal Y and the inner conductor 18*a* of the connector jack. The impedance transformer 32 includes a pair of windings 32*a* and 32*b* wound on a common core 33 of a generally cylindrical shape and preferably formed of a suitable compressed ferrite material. Similarly, the impedance transformer 34 includes a pair of windings 34*a* and 34*b* wound on a like ferrite core 35. The winding 32*a* is shown connected between the reference terminal X and the inner conductor 16*a* of the connector jack 16 and the winding 32*b* is shown connected between the inner conductor 16*a* and ground through a DC blocking capacitor 36. Likewise, the winding 34*a* is shown connected between the reference terminal Y and the inner conductor 18*a* of the connector jack 18 and the winding 34*b* connected between the inner conductor 18*a* and ground through a DC blocking capacitor 38**.

Figure 4:
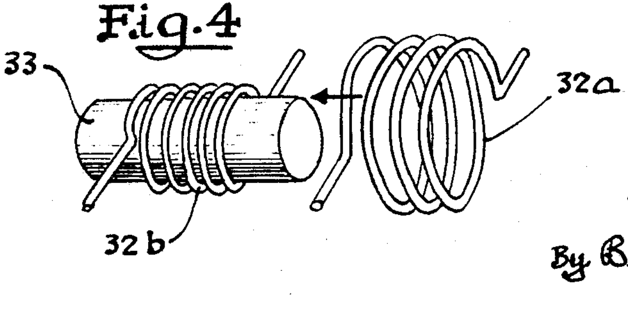
FIGURE 4 is a view in perspective of the impedance transformer illustrating the winding detail thereof.

FIGURE 4 illustrates the winding detail for the impedance transformer 32. It is to be understood that it is the same for the transformer 34. In its preferred embodiment, the winding **32*b* is wound first on the ferrite core 33 approximately five turns. The winding itself may be formed from small-size, lacquered wire, or other suitably insulated conductor. The winding 32*a* is then wound on top of, or "backwound" upon, the winding 32*b* approximately two complete turns. The winding 32*b* is shown separated from the winding 32*a*** in FIGURE 4 in the interests of clarity. The significance of this construction will be hereinafter discussed.

As previously mentioned, the windings **22*a* and 22*b* of the coupling transformer 22 have substantially equal electrical characteristics. The transformer 22 is connected as an autotransformer having twice as many turns in the secondary (being windings 22*a* and 22*b* in combination) for a turns ratio $n$ of two. The impedance across the reference terminals is equal to $n$ squared, or four times the impedance present at the connector jack 14. With the impedance at the jack 14** being approximately 75 ohms, the characteristic impedance of the transmission line $TL_1$, the impedance as presented across the reference terminals X and Y is approximately 300 ohms.

The transmission lines $TL_2$ and $TL_3$ are effectively connected in series between the reference terminals X and Y, with the impedance transformers 32 and 34 interposed, respectively, between a reference terminal and the associated transmission line. The primaries of each of the transformers 32 and 34 total about seven turns (being the 5 turns of windings 32*a* and 34*a* plus the two turns of the windings 32*b* and 34*b*), and the secondaries 32*b* and 34*b* having approximately 5 turns. This presents a turn ratio *n* of 5/7. The impedance transformation from each of the reference terminals X and Y to the respective connector jack 16 and 18 is equal to the square of the turns ratio, i.e., 25/49, or approximately ½. Thus, taking the impedance at each of the reference terminals as approximately 150 ohms, the impedance at the output connector jacks 16 and 18 is about 75 ohms. This substantially matches the characteristic impedance of the lines $TL_2$ and $TL_3$ on one side and the impedance as presented to the reference terminals X and Y by the coupling transformer 22 on the other side. Thus all terminal impedances are closely matched in the line-splitter device 10 and maximum operating efficiency is obtained for the transfer of signals from the source line $TL_1$ to each of the branch lines $TL_2$ and $TL_3$.

Figure 6:
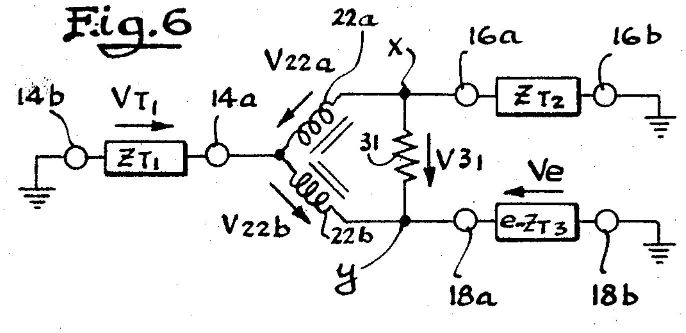
FIGURE 6 is a simplified explanatory diagram of the circuit of FIGURE 2.

In operation, the reference terminals X and Y are effectively isolated from one another so as to prevent undesirable interaction between the signals being fed to the branch lines $TL_2$ and $TL_3$. The isolation effect can best be seen in the simplified diagram of FIGURE 6. The windings 22*a* and 22*b* are poled so that they oppose one another and, being substantially equal, there is no net M.M.F. effective in the core 28 and no induced voltage across the windings 22*a* and 22*b*. The various impedances and circuit connections are shown diagrammatically in FIGURE 6 with number symbols corresponding to those of the apparatus shown in FIGURES 1 and 2. It should be understood, however, that in some instances the actual apparatus is connected only indirectly so that the impedance values of FIGURE 6 do not necessarily mean the same impedance values as measured across the terminals of the apparatus.

For purpose of practical explanation, a signal voltage *e* is assumed to be present in the line $TL_3$. This voltage will, of course, appear as a voltage "behind" an internal impedance which may be referred to as $Z_{T3}$. Thus, one circuit through which current may flow as a consequence of this reference voltage *e* is through the winding 22*b* to the terminal 14*a*, and from there through the internal impedance $Z_{T1}$ of the transmission line $TL_1$ to the terminal 14*b*. The actual voltage appearing across the winding 22*b* will be less than the value of the voltage *e* in an amount determined by the relative impedances in this series circuit. The direction of the voltages across the winding 22*b* and the impedance $Z_{T1}$ will be in opposition to the voltage *e*, as indicated by the arrows $V_e$, $V_{22b}$ and $V_{T1}$.

Another circuit thru which current may flow as a consequence of the voltage *e* is through the resistance 31 and the internal impedance $Z_{T2}$ of the transmission line $TL_2$. The actual voltage appearing across the impedance $Z_{T2}$ must equal the voltage at the terminals of the impedance $Z_{T3}$, less the voltage drop across the resistance 31. If these voltages are equal to the terminal voltage of the impedance $Z_{T3}$ due to the voltage *e*, then no voltage will appear across the impedance $Z_{T2}$ and effective isolation is achieved between terminals X and Y, and in turn, between the branch transmission lines $TL_2$ and $TL_3$.

Another factor to be considered in the overall efficiency of the line-splitter 10 is the impedance match effected between the transmission lines $TL_1$, $TL_2$ and $TL_3$ and the coax connector jacks 14, 16 and 18. Each of the transmission lines terminates in a female coax receptacle unit, such as shown at 40 in FIGURE 5. The unit 40 includes a sleeve portion 40*a* at the rear dimensioned to slide underneath the transmission cable metallic braid B as shown. A ring 42 is clamped around the outside of the cable $TL_1$ to secure the receptacle unit 40 thereto. The receptacle unit 40 includes a rotatable cap 40*b* to the front and is internally threaded as shown. The receptacle 40 is intended to mate with the male connector jack, such as 14, having external mating threads on the outer conductor 14*b* and a hollow inner conductor 14*a* through a portion of its longitudinal length. The connector jack 14 is secured to the surface of the chassis 12 by a mounting nut 44, as shown.

Figure 8:
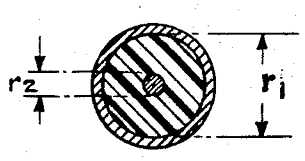
FIGURE 8 is a cross-sectional representation of a section of coax transmission line cable.

It in well known that the characteristic impedance of a coaxial transmission cable or fitting may be determined by the ratio of the respective diameters of the inner and outer conductors in conjunction with the type of dielectric used. More specifically, the characteristic impedance may be expressed by the relation:

$$Z_o=\frac{138}{\sqrt{K}}\times\log_{10}\cdot(r_1/r_2)$$

where $r_1$ is the inside diameter of the outer conductor, and $r_2$ is the outside diameter of the inner conductor, as shown in FIGURE 8, and K is the dielectric constant. For transmission lines such as $TL_1$, $TL_2$ and $TL_3$, $r_1$ approximates 9/64 of an inch and $r_2$ approximates 3/128 of an inch. With a dielectric constant K for polystyrene given as 2.2, the characteristic impedance as calculated according to the above mathematical expression is approximately 72 ohms.

Figure 5:
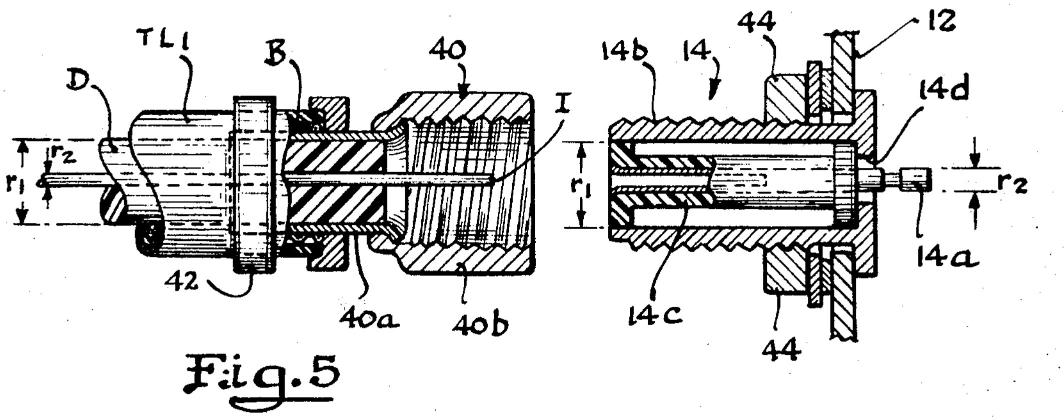
FIGURE 5 is a side cross-sectional view of the coax connector fitting, including jack and receptacle, as used in the line-splitter device.

As seen in FIGURE 5, the $r_1$ dimension for the connector jack 14 remains the same as for the transmission line $TL_1$, or about 9/64″. However the $r_2$ dimension, i.e., the outside diameter of the inner conductor 14*a*, is somewhat larger, being partially hollow to accept the inner conductor I of the transmission line therein. Typically, it is about 3/64 of an inch. This represents a nominal difference in diameter between the respective inner conductors of the cable and connector jack of approximately 3/128 of an inch. Such variation, being relatively small in numerical value, would not ordinarily be thought of as a source of significant mismatch between cable and connector jack, and has been treated thusly in the past. However, a calculation of the impedance with the increased inner conductor diameter shows a decrease to approximately 44 ohms, which is only 60% that of the characteristic impedance of 72 ohms for the transmission cable $TL_1$.

Figure 7:
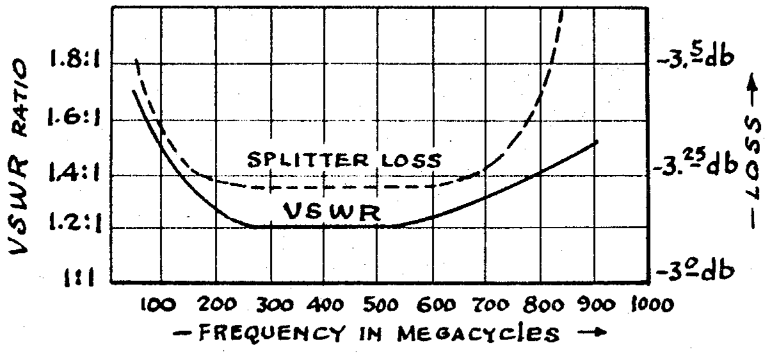
FIGURE 7 is a graph depicting typical loss and voltage standing wave ratio characteristics of the line-splitter of the present invention and useful in the operational description thereof.

Such undesirable deficiency is overcome in the present invention by the construction of the associated connector jacks in manner to effectively compensate for this variation in inner conductor diameters. It is accomplished by fabricating the section of polystyrene dielectric, indicated at 14*c* in FIGURE 5, in a spool-shaped configuration. This construction provides an essentially air dielectric space between the inner and outer conductors 14*a* and 14*b* of the jack 14 and has the effect of changing the numerical value for the dielectric constant K from 2.2 to a figure approaching an essentially air dielectric, or about 1.1—air having a dielectric constant of 1.0. As the ratio $r_1/r_2$ decreases due to the larger diameter of the inner conductor of the connector jack, the numerical value of the expression $\log_{10}(r_1/r_2)$ decreases. This decrease, however, is substantially offset by the decrease in the dielectric constant K effective between a polystyrene material and one essentially of air. In actual figures, with the $r_1/r_2$ ratio being approximately 9/64″÷3/64″, but with a dielectric constant K of approximately 1.1, the resultant impedance as calculated according to the above mathematical expression is approximately 63 ohms, or about 90% that of the 72 ohm characteristic impedance of the transmission line cable $TL_1$. This enables an improvement of at least 30% in the impedance matching characteristics as compared to an unmodified connector jack having a solid block of polystyrene between its inner and outer conductors. By maintaining a substantially accurate impedance match between the transmission lines and connector jacks, the insertion loss of the splitter device is minimized as is the standing wave reflections at the point of connections, FIGURE 7 shows graphically the average or typical VSWR and loss characteristic of a line-splitter device that may be expected when constructed in accordance with the present invention. The VSWR, shown in solid line, is seen not to exceed 1.5:1 over a frequency range of around 100 to 900 megacycles while the loss characteristic of the splitter, shown in dotted line, is seen not to exceed 3.5 db over approximately the same range, and is less than 3.25 db over a range from about 200 to 700 megacycles—more than 50% of the total operating range. It is to be noted, of course, that the ferrite cores 28, 33 and 35 are also a factor in the overall low-loss characteristics exhibited by the splitter 10 since they effectively restrict the relatively intense magnetic fields to the confines of the respective cores.

A significant factor in the relatively broad operating range of the present line-splitter resides in the unique "backwinding" feature effected in the fabrication of the impedance transformers 32 and 34, i.e., winding one of the coils on top of the other of the coils on a common ferrite core. It has been found that a far greater range of frequencies may be efficiently passed, i.e., up to 1000 megacycles, than with other types of winding configurations or constructions. It is not known precisely the manner in which this contribution occurs, but it is believed to be because of a substantial higher coupling between the associated coils or windings than would otherwise occur where the windings are laterally displaced along the longitudinal axis of the associated ferrite core.

Still another factor in the overall improved efficiency of the line-splitter device 10 of the present invention resides in the fact that one phase of the prior art teaching is totally discarded. Prior devices of this type have usually connected the impedance transformation circuitry to the source line first and then followed by the bridging or coupling circuitry. In this instance the source line is feeding the two branch lines in parallel and accordingly the impedance presented by the source line must be stepped down. In actual figures, the impedance would be stepped down to approximately 36 ohms when using transmission line cable of the type as above described. Obviously then, any significant variations, such as in the characteristic impedances of the transmission lines themselves or in the parameters of the impedance transformation circuitry, will have a significant and substantial effect on the loss characteristic of the line-splitter device. According to the teaching of the present invention, however, the coupling circuitry is connected to the source line first, and then followed by the impedance transformation circuitry. In this case, the impedance is stepped up, not down. Hence, the same variations have decidedly less effect since they are here operating against a terminal impedance of approximately 150 ohms on the high impedance side of the coupling circuitry as compared to but 36 ohms in the prior art apparatus.

This in conjunction with the other features of the present invention provide a line-splitter device having an overall efficiency unmatched in prior devices of this sort and which is capable of operating over the entire frequency range covering both VHF and UHF television channels.

While only one embodiment of the present invention is shown and described herein, it will be understood that certain modifications may be effected without materially departing from the true scope of the invention. It will be understood that the appended claim is intended to cover all such modifications and alternative constructions within their true scope and spirit.

What is claimed is:

1. An improved low-loss line-splitter device operable in the 50 to 1000 megacycle range for the transference of signals from a source transmission line to a pair of branch transmission lines wherein the respective characteristic impedances of the lines are substantially matched and wherein the branch lines are electrically isolated from one another, said device including in combination:

input connector means and first and second output connector means, each of said connector means having inner and outer conductors;

a pair of reference terminals;

a coupling and isolation circuit, said circuit including a first transformer having a pair of windings wound on a common ferrite core member, first and second capacitor means and a resistance, each of said transformer windings being connected between the inner conductor of said input connector means and a respective reference terminal, said first capacitor means being connected between one of said reference terminals and ground, said second capacitor means being connected between said other reference terminal and ground, and said resistance being connected between said reference terminals, said circuit further having means to effect isolation between said reference terminals each from the other including said pair of windings being made substantially equal and poled in opposition to one another such that there is an absence of a net magnetomotive force in said core;

first impedance transformation means interconnecting one of said reference terminals and said first output connector means, said impedance transformation means including a second transformer having a pair of windings wound on a common ferrite core member and a third capacitor means, one of said transformer windings being connected between said one reference terminal and the inner conductor of said first output connector means with the other of said transformer windings being connected between said inner conductor and ground through said third capacitor means; and second impedance transformation means interconnecting the other of said reference terminals and said second output connector means, said impedance transformation means including a third transformer having a pair of windings wound on a common ferrite core member and a fourth capacitor means, one of said transformer windings being connected between said other reference terminal and the inner conductor of said second connector means with the other of said transformer windings being connected between said inner conductor and ground through said fourth capacitor means, each of said second and third transformers having one of its windings backwound upon the other of its windings on said common ferrite core member so as to enable effective operation throughout the 50 to 1000 megacycle range.

References Cited

UNITED STATES PATENTS

| | | | |
|---|---|---|---|
| 2,971,173 | 2/1961 | Kajihara | 333—32 XR |
| 3,037,175 | 5/1962 | Ruthroff | 333—32 |
| 2,700,129 | 1/1955 | Guanella | 323—83 |
| 3,192,490 | 6/1965 | Petts et al. | 333—11 |
| 3,245,027 | 4/1966 | Ziegler | 333—97 XR |

HERMAN KARL SAALBACH, *Primary Examiner.*

MARVIN NUSSBAUM, *Assistant Examiner.*

U.S. Cl. X.R.

333—11